United States Patent [19]

Hart et al.

[11] 4,423,610
[45] Jan. 3, 1984

[54] SHACKLE LOCK

[75] Inventors: Judy L. Hart; William A. Munday, both of Seattle, Wash.

[73] Assignee: Gross National Products, Inc., Seattle, Wash.

[21] Appl. No.: 275,895

[22] Filed: Jun. 22, 1981

[51] Int. Cl.³ .............................................. E05B 73/00
[52] U.S. Cl. ..................................... 70/18; 70/14
[58] Field of Search ................ 70/18, 14, 15, 260; 59/86; 24/201 HL, 230.5 R

[56] References Cited

U.S. PATENT DOCUMENTS

| | | |
|---|---|---|
| 1,002,120 | 8/1911 | Berner ................................. 70/18 |
| 3,559,429 | 2/1971 | Hermann . |
| 3,747,783 | 7/1983 | Long . |
| 3,754,418 | 8/1973 | Miller . |
| 3,830,085 | 8/1974 | Gerlach . |
| 4,122,693 | 10/1978 | Barr . |

*Primary Examiner*—Robert L. Wolfe

[57] ABSTRACT

A device for securing a shackle by limiting the rotation of the cross bolt includes means, such as a jamming block, for blocking the path of rotation of the cross bolt's head, and means for holding the blocking means in its blocking position. This holding means can comprise a flange which will restrict movement of the jamming block, or a spring urging the block into its rotation blocking position. The shackle securing device can be made tamper-proof by locking it onto the eye of a cross bolt with a padlock.

12 Claims, 8 Drawing Figures

4,423,610

SHACKLE LOCK

BACKGROUND OF THE INVENTION

1. Field of the Invention

The invention relates to a securing device to prevent a cross bolt from disengaging from a shackle. Such shackles are commonly used in industry for material handling purposes.

2. Description of the Prior Art

The threaded cross bolt type shackle is commonly used in the marine and heavy construction industries. Such a shackle has an eye at the end of each of two legs. One of the eyes is threaded. The shackle is used in conjunction with a cross bolt, or pin, which is usually threaded at one end, and provided with an eye type or bolt type head at the other end. In use, the threaded pin or cross bolt is inserted through the eyes of the shackle and threadedly engaged therewith. Cable, chain, rope or the like can then be looped around the cross bolt and around the shackle for slinging loads or other purposes.

An unsecured cross bolt which is merely screwed into a shackle may disengage if the shackle is jarred, vibrated, or otherwise subjected to adverse workplace conditions. Up to now, the common method for securing a cross bolt in a shackle has been to twist wire around and through the shackle and the pin. This method has several significant drawbacks. First, this method of wiring the shackle and bolt is time-consuming and inconvenient. Second, this method is unreliable; the wiring may inadvertently be done in such a way as to fail to secure the cross bolt in the shackle. This unsecured condition may not be detectable by visual inspection and thus could be overlooked. Also, the wiring may come loose accidentally due to the jarring and strain to which a shackle is subjected during use. Furthermore, a shackle which is secured only by wiring can easily be tampered with. Such tampering may not be apparent until its purpose is accomplished, with hazardous results.

Shackles often hold heavy loads in areas heavily occupied by workers, such as construction sites. The unreliability of the wiring method of securing a shackle presents a safety hazard, since serious injury can result if a cross bolt disengages from a shackle, thereby releasing a load carried by the shackle. At the very least, damage to equipment or materials can be expected.

SUMMARY OF THE INVENTION

This invention is intended to overcome the inconvenience and the serious safety problems involved in the conventional method of securing a shackle. The shackle lock of the present invention is simple and convenient to use. It is also highly reliable, since proper securing of a shackle is quickly and easily accomplished. Also, a glance at the device will make it immediately apparent to a worker whether or not the shackle is, in fact, secured. The shackle lock of the present invention is designed so that, once secured, it cannot come loose if jarred, vibrated or otherwise subjected to adverse workplace conditions. Although the unsecuring operation is easily performed, it requires deliberate human effort and cannot occur accidentally. The shackle lock of the present invention can be made tamper-proof, since it can be provided with means for locking it on a shackle with a padlock.

This device for securing a shackle by limiting the rotation of the cross bolt includes means, such as a jamming block, for blocking the path of rotation of the cross bolt's head, and means for holding the blocking means in its blocking position. This holding means can comprise a flange which will restrict movement of the jamming block, or a spring urging the block into its rotation blocking position. The shackle securing device can be made tamper-proof by locking it onto the eye of a cross bolt with a padlock.

In one embodiment, the shackle securing device consists of a base plate which is clamped against the shackle body by the head of a cross bolt. A yoke is formed on one side of the base to engage the leg of the shackle and prevent rotation of the base. A movable jam block is attached to the base, and can be moved to a position where it stands in the way of rotation of the cross bolt, thus preventing the cross bolt from becoming unscrewed and disengaging from the shackle.

This shackle securing device can be reused any number of times. It does not project into the space within the shackle frame. Thus, it does not interfere with cables, chains or ropes being used with the shackle. The shackle lock also requires no modification of the shackles and cross bolts being commonly used today.

DESCRIPTION OF THE PREFERRED EMBODIMENTS

Figure 1:
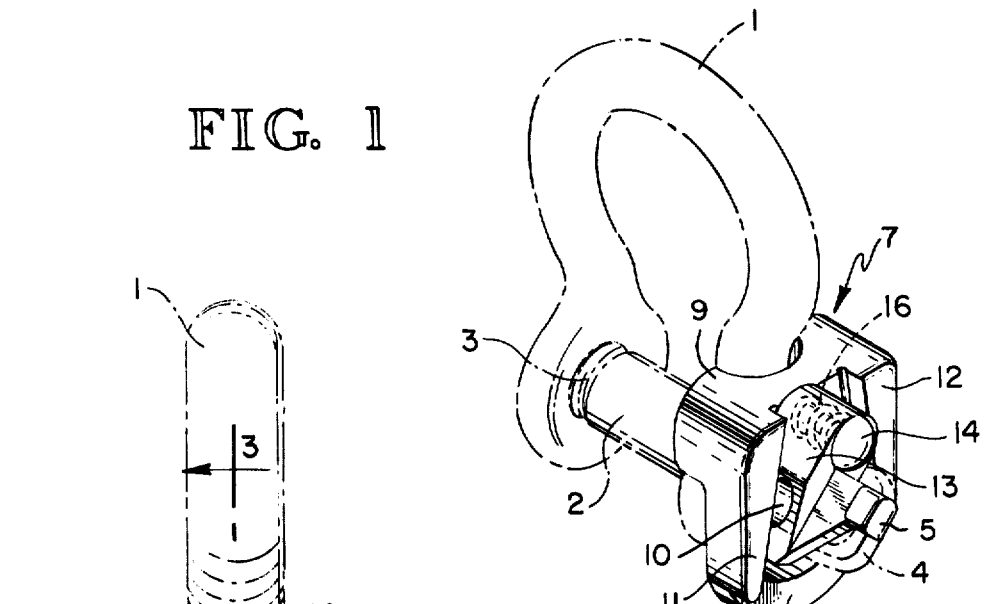
FIG. 1 is a side perspective view of the preferred embodiment of the invention.
Figure 2:
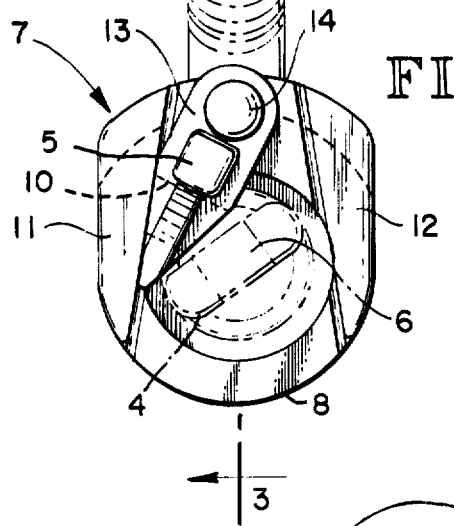
FIG. 2 is a front elevational view of the preferred embodiment.
Figure 3:
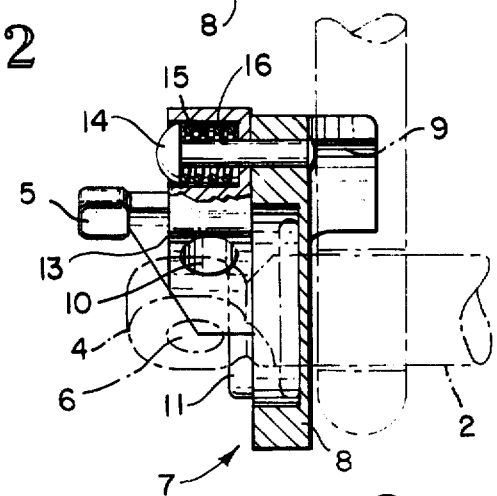
FIG. 3 is a sectional view of the preferred embodiment taken along line 3—3 of FIG. 2.

Referring to FIGS. 1-3, a shackle assembly consists of a shackle 1 and a cross bolt or through pin 2. A key-hole shaped shackle 1 is illustrated, although the device of the present invention may be used with this or any other type of shackle. The cross bolt 2 has a threaded end 3. At the other end is a head 4 which commonly has an eye 6. In FIGS. 1-3, the shackle lock is indicated generally by the numeral 7. In the preferred embodiment, the lock 7 consists of a body portion or base plate 8 which fits against the shackle 1. The base 8 has a hole through its center through which the cross bolt 2 can be inserted. The base 8 has a yoke 9 which enables the lock 7 to fit snugly against the shackle 1, and also prevents the lock 7 from rotating relative to the shackle 1.

On the opposite side of the base plate 8 are a pair of raised flanges 11 and 12 and a jam block 13. In the preferred embodiment, the jam block 13 is a tapered wedge with a projecting finger grip 5 and a longitudinal recess 15 in its wider end. The block 13 is pivotally attached to the base 8 by a rivet 14, or other attaching means which will act as a pivot pin, extending through the recess 15. Compressed spring 16 is located in recess 15 around rivet 14, with one end in contact with the bottom of recess 15 and the other in contact with the head of the rivet 14. The spring 16 urges the jam block 13 against the body 8. This assures that the lock 7 cannot be knocked unsecured accidentally, and that the shackle lock 7 can be removed only by a deliberate effort to lift and rotate the block 13. Recess 15 can be provided with a small access hole (not shown) through which debris can be cleared out. A hole 10 in the tapered end of jam block 13 will allow the shackle lock 7 to be made tamper-proof by the insertion of a padlock through the hole 10 and cross bolt eye 6.

In a preferred embodiment, the base 8 and block 13 will be cast from stainless steel, which has the advantages of being strong, durable and resistant to rust and corrosion.

Figure 4:
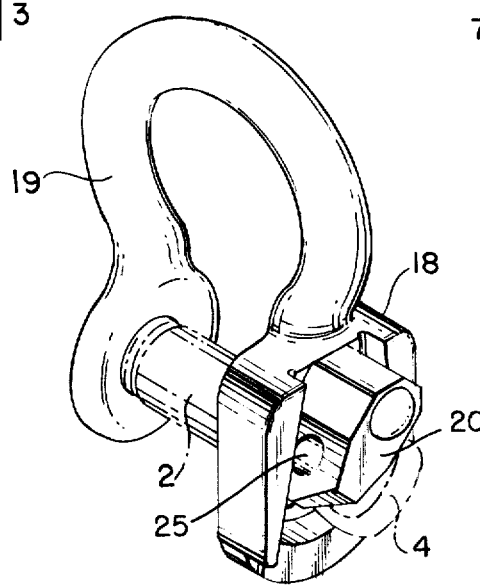
FIG. 4 is a side perspective view of a second embodiment of the invention.
Figure 5:
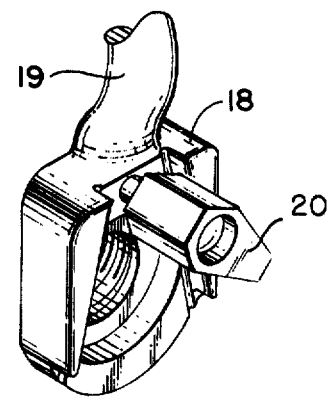
FIG. 5 is a side perspective view of the second embodiment in the unsecured state.
Figure 6:
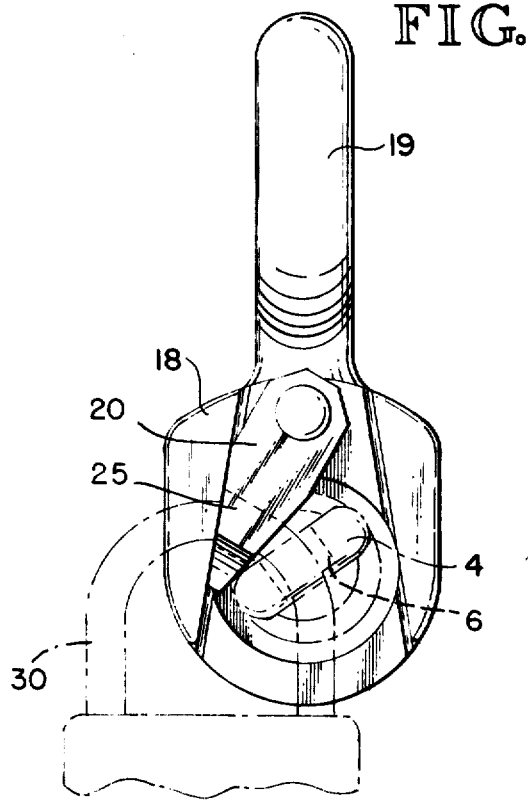
FIG. 6 is a front elevational view of the second embodiment.

FIGS. 4–6 show another embodiment of this invention, in which a shackle lock 18 is made an integral part of a shackle 19. Such a device can be made for use with a normal cross bolt 2, with the base portion of the shackle lock cast directly on a leg of the shackle 19 in place of an eye. This embodiment is convenient because the shackle lock cannot be misplaced, and it is always in proper position for use. The jam block 20, having flat surfaces and no projecting finger grip, is an alternative to the preferred block 13 of FIGS. 1–3. This jam block 20 has a padlock hole 25. FIG. 6 illustrates the use of a padlock 30 with the invention.

In use, the securing mechanisms of the FIGS. 1–3 embodiment and the FIGS. 4–6 embodiment are nearly identical. The jam block 13 or 20 is lifted and pivoted out of the way as in FIG. 5. In the preferred embodiment, one then positions the lock 7 with its yoke 9 against the shackle 1. Then, the cross bolt 2 is inserted through the lock 7 and the shackle 1. After the cross bolt 2 is screwed into the shackle 1, the jam block 13 is rotated into a position between one of the flanges 11 and 12 and the cross bolt head 4, and allowed to drop against the base 8 under the influence of spring 16. If necessary, the cross bolt 2 can be rotated slightly so that the jam block 13 can fit between it and one of the flanges 11 and 12. Cross bolts and shackles have sufficient threading to allow this adjustment without becoming unscrewed, as is evident from the common practice of screwing a cross bolt tight and then loosening it by a quarter turn backward before use. The jam block 13 can rotate in both a clockwise and counterclockwise direction so that the needed rotational adjustment of the cross bolt 2 will be small.

The locking action of the jam block 13 can best be seen in FIG. 2. With the block 13 between the cross bolt head 4 and the flange 11, the cross bolt head 4 does not have enough room to rotate more than a few degrees. Thus, the cross bolt 2 cannot be unscrewed from the shackle 1. Whether or not block 13 is properly placed in the locking position can easily be seen at a glance.

It will be understood that variations of the above described embodiments are possible, without departing from the scope of the invention. For example, instead of rotating, a jam block may be slidable or otherwise movable into a jamming position. Also, the invention can be adapted for use with cross bolts having a bolt-type head rather than an eye-type head. Bolt-type heads are usually either square or hexagonal. The shape of the jam block 13 can be altered from that shown to accommodate any non-round head shape. The shape of the jam block must be such that it will block the path of a cross bolt's rotation, and any jam block which will do so is within the scope of the invention.

Figure 7:
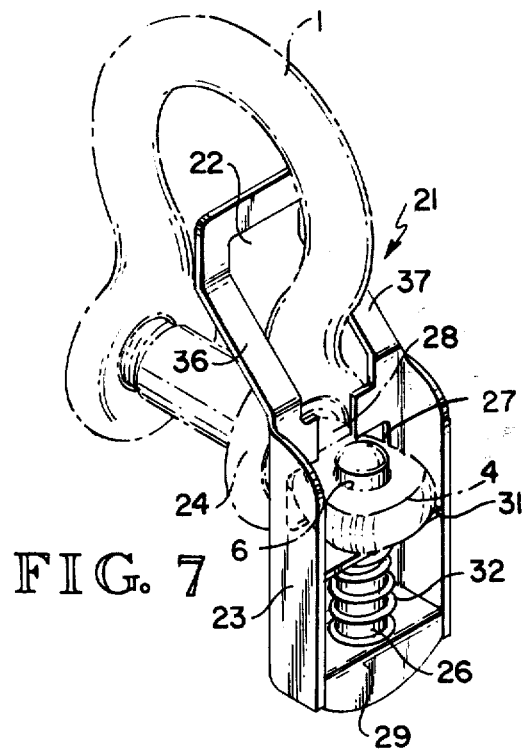
FIG. 7 is a side perspective view of a third embodiment of the invention.
Figure 8:
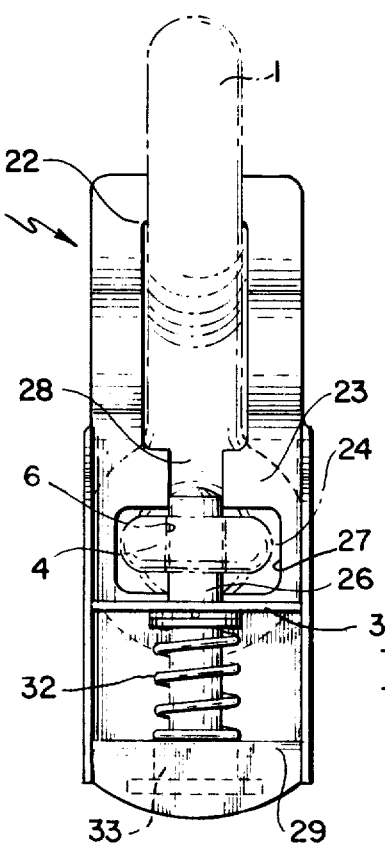
FIG. 8 is a front elevational view of the third embodiment.

An alternative embodiment of the shackle lock is shown in FIGS. 7 and 8. In this embodiment, the shackle lock 21 is used with a conventional shackle 1 and threaded cross bolt 2 with a flat eye-type head 4. The shackle lock 21 comprises a loop 22, which encircles a leg of the shackle 1, a base portion 23 which extends downward from the ends of loop 22 in front of the exterior face of the shackle's unthreaded eye 24, and a movable jam block or plunger 26, which is mounted on the body portion 23 in a manner to be described below.

The body portion 23 has a hole 27 for receiving the cross bolt 2. This hole 27 will preferably take the form of a slot perpendicular to the height of the shackle 1. A second slot 28, perpendicular to and adjoining the first slot 27, may be provided for reasons to be explained below.

At the lower end of body portion 23 is a flange 29. Plunger 26 extends parallel to the body portion 23 and preferably perpendicular to the first slot 27 through a hole in flange 29. A second flange 31 is affixed to the plunger 26, and spring 32 is mounted on the plunger 26 between the two flanges 29 and 31. The spring 32 urges the flange 31, and therefore the affixed plunger 26, away from flange 29. A knob 33 is mounted on the plunger 26 beneath the flange 29, and can be used to pull the plunger 26 downward.

In use, the loop 22 of the shackle lock 21 is placed around the leg of the shackle 1. In the embodiment shown, the lock 21 is held out of the way while cross bolt 2 is engaged with the shackle 1. Cross bolt 2 is left in a position with its head 4 perpendicular to the height of shackle 1. This can be done because conventional cross bolts and shackles have sufficient threading so that they will be engaged even if they are not tightened to the maximum extent possible.

Holding the plunger 26 out of the way of slot 27 by pulling on the knob 33, one then places the slot 27 over the cross bolt's head 4, and positions the plunger 26 adjacent the eye 6 of the cross bolt, so that when knob 33 is released, the plunger 26 will be urged through the eye 6 by the spring 32. With the plunger 26 engaged in the cross bolt's eye 6, the cross bolt 2 cannot rotate.

In the alternative embodiment of FIGS. 7 and 8, a second, tamper-proof securing method is possible. The loop 22 will preferably have sloping legs 36 and 37, which will rest upon the shackle eye 24 when the second slot 28 is adjacent the hole through shackle eye 24. The securing procedure is begun as above, but the cross bolt 2 will be left with its head parallel to the height of the shackle 1. Then, second slot 28 is fitted over the head 4, and a padlock (not shown) is inserted through the cross bolt's eye 6 and locked. Body portion 23 cannot move laterally away from the shackle 1 because the padlock blocks movement in this direction. Body portion 23 cannot move downward, because sloping legs 36 and 37, resting on the eye 24 of the shackle 1, block movement in this direction. Thus, the head 4 of cross bolt 2 cannot escape from the slot 28, which prevents the bolt 2 from rotating.

The embodiment of FIGS. 7 and 8 can be varied without departing from the scope of the invention. For example, that portion of plunger 26 above flange 31 could be eliminated. Rotation of the bolt 2 could then be prevented by the flange 31 abutting upon a flat surface of the bolt head 4 under the influence of spring 32. A hole in the flange 31 can be provided to accommodate a padlock.

The embodiment of FIGS. 7 and 8 will preferably be manufactured from sheet metal, which can be bent to form the sloping legs 36 and 37, body portion 23 and flange 29.

Although the invention has been described with reference to specific embodiments, the reader will understand that the specific embodiments are meant to be illustrative only, and not limiting, and that variations are possible while remaining within the scope of the invention.

What is claimed is:

1. A device for securing a cross bolt having an eye in a shackle comprising:
    a plunger insertable through the eye of the cross bolt when the cross bolt is engaged with the shackle,
    spring means urging the plunger through the eye of the cross bolt,
    means for preventing rotation of the plunger and spring means relative to the shackle when the plunger is inserted through the eye.

2. The device of claim 1 wherein the rotation preventing means comprises a loop through which a leg of the shackle is engaged.

3. A device for limiting the rotation of a cross bolt in a shackle comprising:
    a base,
    at least a pair of projections on the base between which the leg of the shackle is engaged to prevent rotation of the base relative to the shackle,
    means for selectively blocking the path of rotation of the head of the cross bolt,
    means for restricting movement of the blocking means relative to the base.

4. The device of claim 3 wherein the means for restricting movement of the blocking means relative to the base comprises a flange on the base in close proximity to the blocking means when the blocking means is in the rotation blocking position.

5. A device for securing a cross bolt in a shackle comprising:
    a base having a hole therethrough for receiving the cross bolt,
    a jamming block which is pivotally movable in a plane parallel to the plane of the cross bolt's rotation and which jamming block is attached to the base and selectively movable from a first position in which it will not intercept the head of a cross bolt rotating in the hole to a second position where it will intercept the head of a cross bolt rotating in the hole,
    means to hold the block in the second position, and
    means to prevent rotation of the base relative to the shackle.

6. The device of claim 5 wherein the block holding means comprises at least one flange projecting from the base in the path of the block's pivotal motion.

7. The device of claim 5 wherein the jamming block comprises:
    a block having a recess in it's pivoted end,
    a pivot pin extending through the recess and pivotally attaching the block to the base, the block being slidable along the pivot pin to a height above the base greater than the height of the flange, whereby the block can be pivoted over the flange,
    a head on the pivot pin, and
    a spring under compression in the recess having one end in contact with the head of the pivot pin and the other end in contact with the bottom of the recess, whereby the spring urges the block toward the base.

8. The device of claim 7 wherein the base is integral with the shackle.

9. The device of claim 5 wherein the jamming block includes means for receiving a locking shank of a locking device whereby disengagement of the jamming block from the cross bolt head is prevented when a locking device is positioned in said shank receiving means.

10. The device of claims 7 or 8 wherein the jamming block further comprises means for receiving a locking shank of a locking device, whereby disengagement of the jamming block from the cross bolt head is prevented when a locking device is positioned in said shank receiving means.

11. A device for securing a cross bolt having an eye in a shackle comprising:
    means forming a slot for receiving the head of the cross bolt and restricting rotation of the head relative thereto;
    a locking means inserted through the eye of the cross bolt for preventing disengagement of the slot forming means with the head of the cross bolt; and
    means connected to said slot forming means for preventing rotation thereof relative to the shackle.

12. The device of claim 11 wherein said locking means comprises a pin slidably mounted to said slot forming means and spring means connected between the pin and slot forming means for biasing the pin into engagement with the eye of the cross bolt.

* * * * *